(12) United States Patent
Chen

(10) Patent No.: US 10,771,501 B2
(45) Date of Patent: Sep. 8, 2020

(54) DDOS ATTACK DEFENSE METHOD, SYSTEM, AND RELATED DEVICE

(71) Applicant: TENCENT TECHNOLOGY (SHENZHEN) COMPANY LIMITED, Shenzhen (CN)

(72) Inventor: Hu Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/372,113

(22) Filed: Apr. 1, 2019

(65) Prior Publication Data

US 2019/0230118 A1 Jul. 25, 2019

Related U.S. Application Data

(63) Continuation of application No. PCT/CN2017/115494, filed on Dec. 11, 2017.

(30) Foreign Application Priority Data

Dec. 15, 2016 (CN) .......................... 2016 1 1159749

(51) Int. Cl.
*G06F 21/00* (2013.01)
*H04L 29/06* (2006.01)
*H04L 12/24* (2006.01)

(52) U.S. Cl.
CPC .......... *H04L 63/1458* (2013.01); *H04L 29/06* (2013.01); *H04L 41/06* (2013.01);
(Continued)

(58) Field of Classification Search
None
See application file for complete search history.

(56) References Cited

U.S. PATENT DOCUMENTS 8,615,785 B2 * 12/2013 Elrod .................. H04L 63/1416
370/245
9,641,544 B1 * 5/2017 Treat .................. H04L 63/1425
(Continued)

FOREIGN PATENT DOCUMENTS

CN 101022343 A 8/2007
CN 103561011 A 2/2014
(Continued)

OTHER PUBLICATIONS

Office Action dated Jun. 28, 2019 in Chinese Patent Application No. 201611159749.6 (With Concise English Translation), p. 1-9.
(Continued)

*Primary Examiner* — Maung T Lwin
(74) *Attorney, Agent, or Firm* — Oblon, McClelland, Maier & Neustadt, L.L.P.

(57) ABSTRACT

A method, blocking device, and a non-transitory computer-readable storage medium are provided. For example, the method is performed by processing circuitry of the blocking device. In the method, alarm data that includes attacking information of attacking packets among packets that enter a service network that provides services to servers is received. The alarm data is generated based on parsing the packets to identify the attacking packets and to determine the attacking information of the attacking packets. A blocking policy for blocking the attacking packets is determined based on the alarm data and blocking rules for determining whether the servers are attacked. A blocking action is initiated to block the attacking packets based on the blocking policy.

18 Claims, 4 Drawing Sheets

(52) U.S. Cl.
CPC ...... *H04L 63/0263* (2013.01); *H04L 63/1416* (2013.01); *H04L 63/1425* (2013.01)

(56) References Cited

U.S. PATENT DOCUMENTS

| | | | | |
|---|---|---|---|---|
| 2010/0082513 | A1* | 4/2010 | Liu | H04L 63/1458 706/46 |
| 2010/0107261 | A1* | 4/2010 | Nagoya | H04L 63/0263 726/30 |
| 2013/0254872 | A1* | 9/2013 | Lawson | H04L 63/1458 726/13 |
| 2014/0157405 | A1* | 6/2014 | Joll | H04L 63/1425 726/22 |
| 2014/0173731 | A1* | 6/2014 | Mantripragada | H04L 12/66 726/22 |
| 2014/0237599 | A1* | 8/2014 | Gertner | H04L 63/1441 726/24 |
| 2014/0325649 | A1 | 10/2014 | Zhang | |
| 2018/0013787 | A1 | 1/2018 | Jiang | |

FOREIGN PATENT DOCUMENTS

| | | |
|---|---|---|
| CN | 104519016 | 4/2015 |
| CN | 106161333 A | 11/2016 |

OTHER PUBLICATIONS

International Preliminary Report on Patentability dated Jun. 18, 2019 in PCT/CN2017/115494 filed Dec. 11, 2017. p. 1-4.
English Translation of Written Opinion of the International Searching Authority dated Feb. 26, 2018 in PCT/CN2017/115494 filed Dec. 11, 2017. p. 1-4.
International Search Report dated Feb. 26, 2018 in PCT/CN2017/115494 with English Translation.
Written Opinion dated Feb. 26, 2018 in PCT/CN2017/115494.

* cited by examiner

DDOS ATTACK DEFENSE METHOD, SYSTEM, AND RELATED DEVICE

RELATED APPLICATION

This application is a continuation of International Application No. PCT/CN2017/115494, filed on Dec. 11, 2017, which claims priority to Chinese Patent Application with Application No. 201611159749.6, filed on Dec. 15, 2016. The entire disclosures of the prior applications are hereby incorporated by reference in their entirety.

FIELD OF THE TECHNOLOGY

The present disclosure relates to the field of Internet technologies for a DDoS attack defense method and system, a related device, and a computer storage medium.

BACKGROUND OF THE DISCLOSURE

Distributed denial-of-service (DDoS) is to initiate a large quantity of seemingly legal requests to a service provider by using a distributed client, and consumes resources or occupies resources for a long period of time, to achieve an objective of denial-of-service. There are many DDOS attack methods. A most basic DDoS attack includes occupying excessive service resources by using proper service request. Consequently, a legal user cannot obtain a response from a server. Alternatively, a most basic DDoS attack includes blocking an upstream communications link of an Internet Data Center (IDC) by sending a large quantity of packets in a short time. Consequently, an available bandwidth is dramatically reduced, resulting in a sudden increase in a normal service flow, to achieve the objective of denial-of-service. Therefore, how to defend a DDoS attack in a timely manner becomes a problem to be urgently resolved.

SUMMARY

The present disclosure discloses a DDoS attack defense method and system, a blocking device, and a computer storage medium for improvement of defense against a DDoS attack.

In one aspect, there is provided a method. For example, the method is performed by processing circuitry of a blocking device. Alarm data that includes attacking information of attacking packets among packets that enter a service network that provides services to servers is received. The alarm data is generated based on parsing the packets to identify the attacking packets and to determine the attacking information of the attacking packets. A blocking policy for blocking the attacking packets is determined based on the alarm data and blocking rules for determining whether the servers are attacked. A blocking action is initiated to block the attacking packets based on the blocking policy.

In one embodiment, the packets that enter the service network that provides the services to the servers are mirrored by an optical splitter from an internet service provider in real time.

In one embodiment, the packets to identify the attacking packets are parsed according to a specification of a network protocol stack of the service network. The received alarm data contains at least an attack time, an attack type, a destination internet protocol, an attack position, a value corresponding to the packets, a transmission control protocol of the network protocol stack, or a user datagram protocol of the network protocol stack.

In one embodiment, the blocking rules are based on types of clients of an internet service provider, which is defined by at least one of payment method by the clients, bandwidth purchased by the clients, and quantity of users of the clients. The blocking rules are customized according to a request of one of the clients of the internet service provider. The one of the clients is at least one of a border gateway protocol high-defense client or a client with high priority.

In one embodiment, the determining the blocking policy for blocking the attacking packets includes that a type of a client of an internet provider is determined according to a destination internet protocol of the alarm data. A blocking threshold is obtained corresponding to the determined type of the client. Packets of the destination internet protocol of the alarm data are compared with the obtained blocking threshold and a security threshold corresponding to the servers. A first notification of the blocking action is sent to the servers when the packets of the destination internet protocol of the alarm data are greater than or equal to the obtained blocking threshold and are smaller than the security threshold corresponding to the servers. A second notification of the blocking action is sent to the internet service provider when the packets of the destination internet protocol of the alarm data are greater than or equal to the security threshold corresponding to the servers. The initiating the blocking action to block the attacking packets based on the blocking policy includes that an ingress router or a core switch of the servers is caused to discard the packets of the destination internet protocol of the alarm data, or a blocking interface of the internet service provider is caused to discard the packets of the destination internet protocol before the packets reach the servers.

In one embodiment, the determining the blocking policy for blocking the attacking packets includes that a plurality of destination internet protocols of the alarm data having a same alarm time are obtained. A sum of the packets of the plurality of destination internet protocols of the alarm data is compared with a security threshold corresponding to the servers. The destination internet protocols that are to be blocked through the blocking action is determined based on types of clients of an internet service provider and the packets corresponding to the plurality of destination internet protocols of the alarm data when the sum of the packets of the plurality of destination internet protocols of the alarm data is greater than or equal to the security threshold corresponding to the servers. A notification of the blocking action is sent to the internet service provider. The initiating the blocking action to block the attacking packets based on the blocking policy includes a blocking interface of the internet service provider is caused to discard the packets of the determined destination internet protocol before the packets reach the servers.

In one embodiment, a result of the blocking action is sent to a client of an internet service provider so that the client adjusts an internet service that is affected by the attacking packets in real time or selects an alternative internet service. The result of the blocking action contains at least one of a blocking time, a service type of the attacking packets, or a value corresponding to the packets.

In one aspect, there is provided a blocking device for defending against a distributed denial of service (DDoS) attack. The blocking device includes processing circuitry configured to receive alarm data that includes attacking information of attacking packets among packets that enter a service network that provides services to servers. The alarm data is generated based on parsing the packets to identify the attacking packets and to determine the attacking information of the attacking packets. The processing circuitry is configured to determine a blocking policy for blocking the attacking packets based on the alarm data and blocking rules for determining whether the servers are attacked. The processing circuitry is configured to initiate a blocking action to block the attacking packets based on the blocking policy.

In one embodiment, the packets that enter the service network that provides the services to the servers are mirrored by an optical splitter from an internet service provider in real time, and the packets to identify the attacking packets are parsed according to a specification of a network protocol stack of the service network. The received alarm data contains at least an attack time, an attack type, a destination internet protocol, an attack position, a value corresponding to the packets, a transmission control protocol of the network protocol stack, or a user datagram protocol of the network protocol stack.

In one embodiment, the blocking rules are based on types of clients of an internet service provider, which is defined by at least one of payment method by the clients, bandwidth purchased by the clients, and quantity of users of the clients. The blocking rules are customized according to a request of one of the clients of the internet service provider. The one of the clients is at least one of a border gateway protocol high-defense client or a client with high priority.

In one embodiment, the determining the blocking policy for blocking the attacking packets includes that a type of a client of an internet provider is determined according to a destination internet protocol of the alarm data. A blocking threshold is obtained corresponding to the determined type of the client. Packets of the destination internet protocol of the alarm data are compared with the obtained blocking threshold and a security threshold corresponding to the servers. A first notification of the blocking action is sent to the servers when the packets of the destination internet protocol of the alarm data are greater than or equal to the obtained blocking threshold and are smaller than the security threshold corresponding to the servers. A notification of the blocking action is sent to the internet service provider when the packets of the destination internet protocol of the alarm data are greater than or equal to the security threshold corresponding to the servers. The initiating the blocking action to block the attacking packets based on the blocking policy includes that an ingress router or a core switch of the servers is caused to discard the packets of the destination internet protocol of the alarm data, or a blocking interface of the internet service provider is caused to discard the packets of the destination internet protocol before the packets reach the servers.

In one embodiment, the determining the blocking policy for blocking the attacking packets includes that a plurality of destination internet protocols of the alarm data having a same alarm time are obtained. A sum of packets of the plurality of destination internet protocols of the alarm data is compared with a security threshold corresponding to the servers. Destination internet protocols that are to be blocked through the blocking action are determined based on types of clients of an internet service provider and packets corresponding to the plurality of destination internet protocols of the alarm data when the sum of the packets of the plurality of destination internet protocols of the alarm data is greater than or equal to the security threshold corresponding to the servers. A notification of the blocking action is sent to the internet service provider. The initiating the blocking action to block the attacking packets based on the blocking policy includes that a blocking interface of the internet service provider is caused to discard packets of the determined destination internet protocol before the packets reach the servers.

In one embodiment, the processing circuitry is further configured to send a result of the blocking action to a client of an internet service provider so that the client adjusts an internet service that is affected by the attacking packets in real time or selects an alternative internet service. The result of the blocking action contains at least one of a blocking time, a service type of the attacking packets, or a value corresponding to the packets.

In one aspect, there is provided a non-transitory computer-readable storage medium. The non-transitory computer-readable storage medium storing instructions which when executed by at least one processor cause the at least one processor to perform receiving alarm data that includes attacking information of attacking packets among packets that enter a service network that provides services to servers, the alarm data is generated based on parsing the packets to identify the attacking packets and to determine the attacking information of the attacking packets, determining a blocking policy for blocking the attacking packets based on the alarm data and blocking rules for determining whether the servers are attacked, and initiating a blocking action to block the attacking packets based on the blocking policy.

In the embodiments of the present disclosure, the DDoS blocking device receives DDoS attack alarm data sent by the DDoS detection device, where the DDoS attack alarm data is obtained after the DDoS detection device parses a service flow flowing into the computer room. The DDoS blocking device matches the DDoS attack alarm data with a DDoS blocking rule, obtains a blocking policy for a service flow corresponding to the DDoS attack alarm data, and blocks the service flow corresponding to the DDoS attack alarm data based on the blocking policy, so that the timeliness and flexibility during defense of a DDoS attack may be improved.

BRIEF DESCRIPTION OF THE DRAWINGS

To describe the technical solutions in the embodiments of the present disclosure or in the existing technology more clearly, the following briefly describes the accompanying drawings for describing the embodiments or the existing technology. The accompanying drawings in the following description show some embodiments of the present disclosure, and a person of ordinary skill in the art may still derive other drawings from these accompanying drawings.

DESCRIPTION OF EMBODIMENTS

The following clearly and completely describes the technical solutions in the embodiments of the present disclosure with reference to the accompanying drawings in the embodiments of the present disclosure. The described embodiments are some but not all of the embodiments of the present disclosure. All other embodiments obtained by a person of ordinary skill in the art based on the embodiments of the present disclosure shall fall within the protection scope of the present disclosure.

Figure 1:
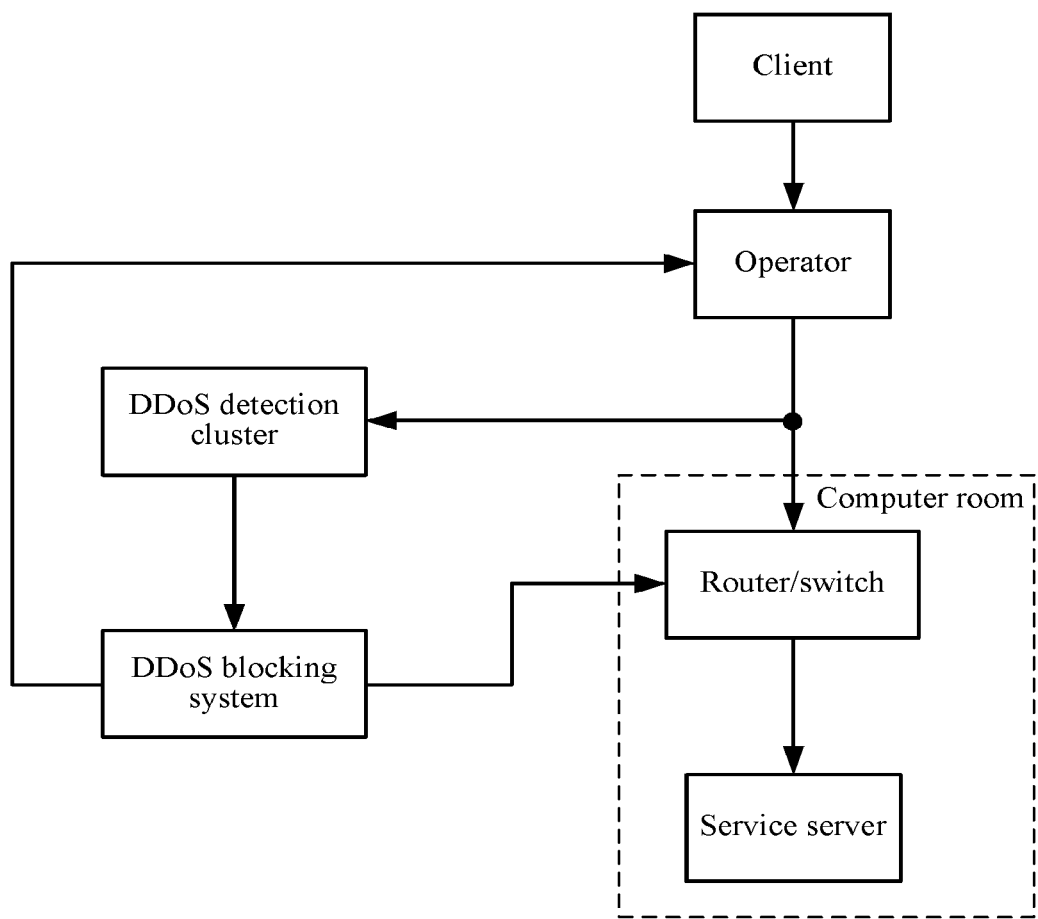
FIG. 1 is a schematic architectural diagram of a DDoS attack defense system according to an embodiment of the present disclosure.

FIG. 1 is a schematic architectural diagram of a DDoS attack defense system according to an embodiment of the present disclosure. An architecture of the DDoS attack defense system described in this embodiment includes a client, an operator, a computer room, a DDoS detection cluster, and a DDoS blocking system.

The operator may be specifically an Internet service provider (ISP).

The computer room includes at least a router/switch and a service server. The router may be specifically an ingress router of the computer room, for example, Tencent Internet Exchange (TIX). The switch may be specifically a core switch of the computer room, for example, Wan Core (WC).

The DDoS detection cluster may be specifically deployed at a computer room entrance, and is configured to perform real-time bypass mirror analysis on a service flow flowing into the computer room.

The DDoS blocking system is configured to block the service flow based on a result of monitoring and analysis of the service flow by the DDoS detection cluster.

When implemented, a service flow from the client reaches the computer room entrance by using an operator's network, and a network device of the computer room, such as the ingress router or the core switch, transfers the service flow to the service server. While the service flow reaches the ingress router or core switch of the computer room, the service flow may be mirrored once in real time by using a device such as an optical splitter, and the mirrored service flow is sent to the DDoS detection cluster. The DDoS detection cluster parses packets of the service flow one by one according to a specification of a network protocol stack, extracts a packet from a DDoS attack, collects and generates DDoS attack alarm data, and sends the DDoS attack alarm data to the DDoS blocking system for processing. The DDoS blocking system determines, based on a developed DDoS blocking rule, whether blocking is performed on the DDoS attack alarm data, including: notifying the ingress router or core switch of the computer room in the computer room to discard a service flow corresponding to the DDoS attack alarm data instead of transferring the service flow to another network device/the service server in the computer room; alternatively, discarding, by an aligned operator, a service flow corresponding to the DDoS attack alarm data before the service flow reaches the computer room, for example, discarding the service flow corresponding to the DDoS attack alarm data on a router of a backbone network (for example, a provincial backbone network).

Figure 2:
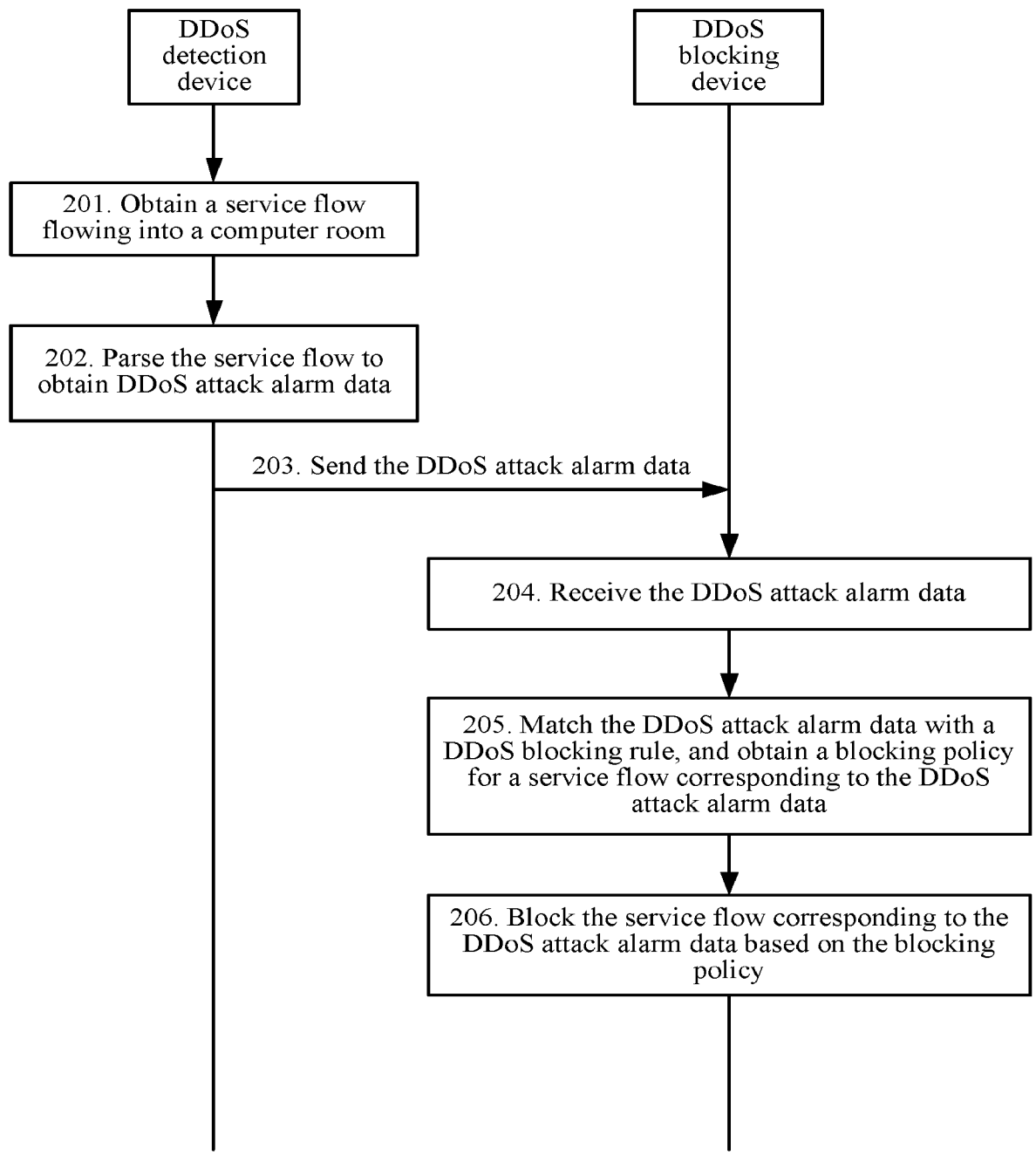
FIG. 2 is a schematic flowchart of a DDoS attack defense method according to an embodiment of the present disclosure.

FIG. 2 is a schematic flowchart of a DDoS attack defense method according to an embodiment of the present disclosure. The DDoS attack defense method described in this embodiment includes the following steps:

In 201, a DDoS detection device obtains a service flow flowing into a computer room.

The DDoS detection device may be deployed at a computer room entrance, and a plurality of DDoS detection devices may be deployed to form a DDoS detection cluster.

In some embodiments, while the service flow reaches the computer room, the service flow may be mirrored once in real time by using an optical splitter and sent to the DDoS detection device.

In 202, the DDoS detection device parses the service flow to obtain DDoS attack alarm data.

In some embodiments, the DDoS detection device parses packets of the service flow one by one according to a specification of a network protocol stack, extracts a packet from a DDoS attack, and collects and generates the DDoS attack alarm data. The DDoS attack alarm data may include: an attack time, an attack type, a destination Internet Protocol (IP), an attack position (for example, an attacked computer room or operator), and a value of the corresponding service flow. The network protocol stack may include: Transmission Control Protocol (TCP)/IP, User Datagram Protocol (UDP), and the like.

In 203, the DDoS detection device sends the DDoS attack alarm data to a DDoS blocking device.

In 204, the DDoS blocking device receives the DDoS attack alarm data.

The DDoS blocking device correspondingly forms a DDoS blocking system.

In some feasible implementations, the DDoS detection device and the DDoS blocking device may alternatively be integrated. That is, DDoS detection and DDoS blocking are integrated into a same device for implementation.

In 205, the DDoS blocking device matches the DDoS attack alarm data with a DDoS blocking rule, and obtains a blocking policy for a service flow corresponding to the DDoS attack alarm data.

A corresponding blocking threshold may be set based on a customer type. If a service flow for performing a DDoS attack reaches or exceeds the blocking threshold, it indicates that a service currently performed by a customer is seriously threatened. The blocking threshold may be specifically represented by using a bandwidth, for example, megabits per second Mbps. The blocking threshold may be a corresponding default blocking threshold of a common customer. The common customer may further be classified into a very important customer and a small customer based on a quantity of users of the customer. The very important customer and the small customer may each correspond to a default blocking threshold. For a special customer (for example, a VIP customer, a Border Gateway Protocol (BGP) high-defense customer), a blocking threshold may be set for the special customer, to implement personalized customization of the blocking threshold. For example, a blocking threshold is set for a customer based on a bandwidth purchased by the customer. Certainly, the blocking threshold may alternatively be allowed to be set for the common customer, or the blocking threshold may be set for the common customer by means of payment. In addition, the computer room may set a security threshold based on use of the bandwidth. If the service flow for performing the DDoS attack reaches or exceeds the security threshold, it may indicate that the stability of a cloud platform corresponding to the computer room is seriously threatened. The blocking policy may include a blocking type, a blocking position, a destination IP, and so on. The blocking type includes notifying the computer room to perform blocking and performing blocking by an aligned operator. The blocking position is a to-be-blocked computer room, an operator's outlet, and so on.

In some embodiments, the DDoS blocking device may determine, based on a destination IP corresponding to the DDoS attack alarm data, whether blocking is performed. This embodiment includes: The DDoS blocking device determines a customer type corresponding the destination IP of the DDoS attack alarm data, and obtains a blocking threshold corresponding to the customer type. If the customer type is the special customer, the DDoS blocking device obtains the corresponding blocking threshold from the cloud platform. The DDoS blocking device compares a service flow of the destination IP with the blocking threshold and the security threshold of the computer room. If the service flow of the destination IP is greater than or equal to the blocking threshold and is less than the security threshold of the computer room, it indicates that a service currently performed by the customer is seriously threatened. The DDoS blocking device determines that the blocking policy for the service flow corresponding to the DDoS attack alarm data is to notify the computer room to block the service flow of the destination IP.

In an implementation of this embodiment of the present disclosure, if the service flow of the destination IP is greater than or equal to the security threshold of the computer room, it indicates that an attacked customer seriously affects a service of another customer. That is, the stability of the cloud platform corresponding to the computer room may be seriously threatened. In this case, the DDoS blocking device determines the blocking policy for the service flow corresponding to the DDoS attack alarm data is that the aligned operator blocks the service flow of the destination IP, that is, discards the service flow of the destination IP before the service flow reaches the computer room.

In some feasible implementations, for a customer for which a blocking threshold needs to be set separately, if the DDoS blocking device cannot obtain the corresponding blocking threshold from the cloud platform, the DDoS blocking device does not process the received DDoS attack alarm data, to avoid a situation such as abnormal operation of the DDoS blocking system that is caused by blocking of a service flow of a non-DDoS attack, to ensure the stability and reliability of the DDoS blocking system.

Meanwhile, the DDoS blocking device may determine, based on the operator's outlet of the computer room, whether blocking is performed. A corresponding blocking threshold is set for an operator connected to the computer room based on use of a bandwidth of the operator. If a service flow flowing through an operator's outlet and for performing a DDoS attack reaches or exceeds the blocking threshold corresponding to the operator, it indicates that a service of the operator may be seriously affected. In this case, it may be considered that the stability of the cloud platform corresponding to the computer room is seriously threatened. This specifically includes: For any one operator's outlet of the computer room, it is assumed that the operator's outlet is a target operator's outlet, the DDoS blocking device obtains a plurality of destination IPs corresponding to DDoS attack alarm data having a same alarm time, and compares service flows of the plurality of destination IPs with a blocking threshold corresponding to the target operator's outlet. If a sum of the service flows of the plurality of destination IPs is greater than or equal to the blocking threshold, it indicates that the stability of the cloud platform corresponding to the computer room is seriously threatened. In this case, the DDoS blocking device obtains the customer types and values of the service flows that respectively correspond to the plurality of destination IPs, where the customer type includes a customer priority, payment, and the like; then rank blocking priorities based on factors such as the customer priority, payment, and values of the service flows, and select a preset quantity of destination IPs having relatively high blocking priorities for performing blocking, to determine a to-be-blocked destination IP in the plurality of destination IPs, and determine that the blocking policy for the service flow corresponding to the DDoS attack alarm data is that the aligned operator blocks the service flow of the to-be-blocked destination IP, that is, discard the service flow of the to-be-blocked destination IP before the service flow reaches the computer room.

In 206, the DDoS blocking device blocks the service flow corresponding to the DDoS attack alarm data based on the blocking policy.

In some embodiments, the DDoS blocking device performs a blocking operation based on information included in the blocking policy, for example, the blocking type, the blocking position, and the destination IP, including: When the blocking type is that the computer room is notified to perform blocking, the DDoS blocking device delivers, by using a blocking interface, a blocking instruction carrying information such as the blocking position and the destination IP to the ingress router or core switch of the computer room, so that the ingress router or core switch of the computer room discards the service flow of the destination IP at the blocking position; or when the blocking type is that the aligned operator performs blocking, the DDoS blocking device invokes a blocking interface provided by the operator, and discards the service flow of the destination IP or to-be-blocked destination IP based on the blocking position before the service flow reaches the computer room, for example, discards the service flow on a router of a provincial backbone network.

In some feasible implementations, the DDoS blocking device may push a blocking result (including a blocking time, a service type of blocking, a flow value, and so on) to the customer, so that the customer learns of blocking status in real time, and adjusts a related affected service in real time. Certainly, the customer may alternatively select whether to active a service for pushing the blocking result, and to receive a blocking result of a designated blocking type. In addition, the DDoS blocking device may further push the situation of abnormality of the blocking (for example, a blocking failure) to an O&M platform, so that an O&M engineer grasps the blocking abnormality in real time, and processes the abnormality in time, thereby further ensuring the reliability and stability of the DDoS blocking system.

In this embodiment of the present disclosure, the DDoS detection device parses a service flow flowing into the computer room to obtain DDoS attack alarm data and sends the DDoS attack alarm data to the DDoS blocking device. The DDoS blocking device matches the DDoS attack alarm data with a DDoS blocking rule, obtains a blocking policy for a service flow corresponding to the DDoS attack alarm data, and blocks the service flow corresponding to the DDoS attack alarm data based on the blocking policy, so that the timeliness and flexibility during defense of a DDoS attack may be improved, thereby improving the robustness of the cloud platform.

Figure 3:
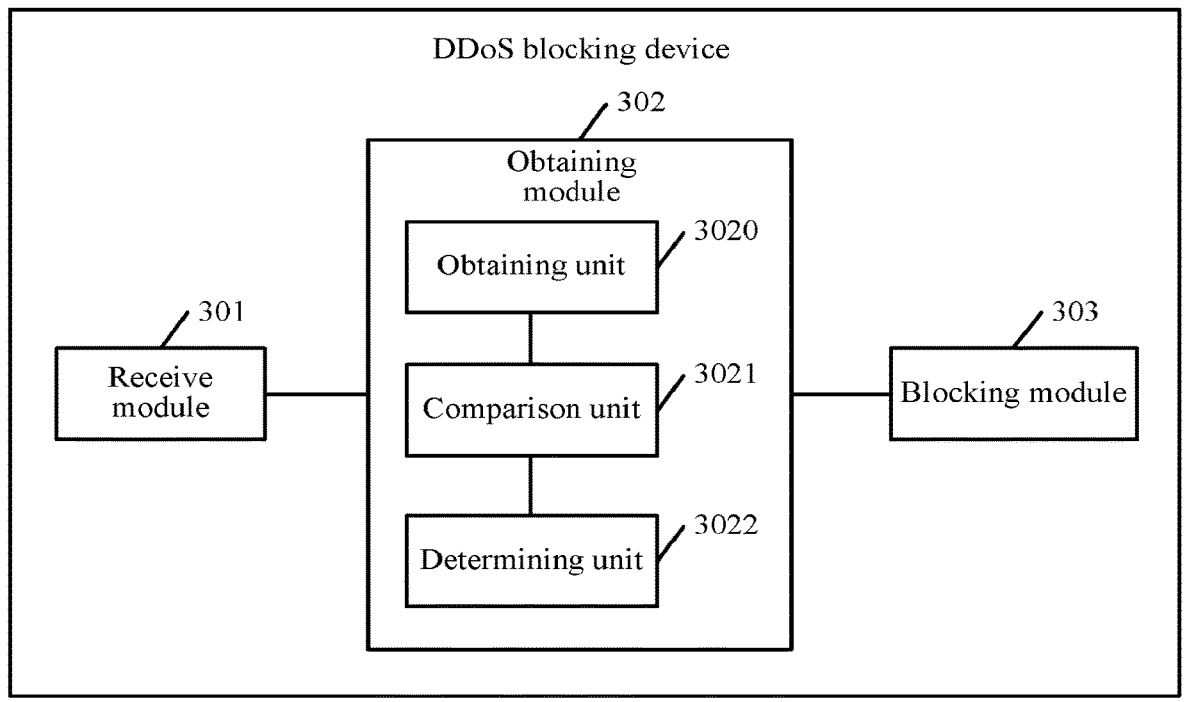
FIG. 3 is a schematic structural diagram of a DDoS blocking device according to an embodiment of the present disclosure.

Referring to FIG. 3, FIG. 3 is a schematic structural diagram of a DDoS blocking device according to an embodiment of the present disclosure. The DDoS blocking device described in this embodiment includes:

a receive module 301, configured to receive DDoS attack alarm data sent by a DDoS detection device, the DDoS attack alarm data being obtained after the DDoS detection device parses a service flow flowing into a computer room;

an obtaining module 302, configured to: match the DDoS attack alarm data with a DDoS blocking rule, and obtain a blocking policy for a service flow corresponding to the DDoS attack alarm data; and a blocking module 303, configured to block the service flow corresponding to the DDoS attack alarm data based on the blocking policy.

In some feasible implementations, the obtaining module 302 includes:

an obtaining unit 3020, configured to: determine a customer type corresponding to a destination IP of the DDoS attack alarm data, and obtain a blocking threshold corresponding to the customer type;

a comparison unit 3021, configured to compare a service flow of the destination IP with the blocking threshold and a security threshold of the computer room; and a determining unit 3022, configured to: if the service flow of the destination IP is greater than or equal to the blocking threshold and is less than the security threshold, determine that the blocking policy for the service flow corresponding to the DDoS attack alarm data is to notify the computer room to block the service flow of the destination IP.

In some feasible implementations, the determining unit 3022 is further configured to: if the service flow of the destination IP is greater than or equal to the security threshold, determine that the blocking policy for the service flow corresponding to the DDoS attack alarm data is that an aligned operator blocks the service flow of the destination IP.

In some feasible implementations, the obtaining unit 3020 is configured to: for a target operator's outlet of the computer room, obtain a plurality of destination IPs corresponding to DDoS attack alarm data having a same alarm time, where the target operator's outlet is any one of operator's outlets included in the computer room.

The comparison unit 3021 is configured to compare service flows of the plurality of destination IPs with a blocking threshold corresponding to the target operator's outlet.

The determining unit 3022 is configured to: if a sum of the service flows of the plurality of destination IPs is greater than or equal to the blocking threshold, determine, based on customer types and values of the service flows that respectively correspond to the plurality of destination IPs, a to-be-blocked destination IP in the plurality of destination IPs.

The determining unit 3022 is further configured to: determine that the blocking policy for the service flow corresponding to the DDoS attack alarm data is that an aligned operator blocks the service flow of the to-be-blocked destination IP.

It may be understood that functions of various functional modules and units of the DDoS blocking device in this embodiment may be specifically implemented according to the method in the foregoing method embodiment, and for a specific implementation process thereof, refer to the related descriptions in the foregoing method embodiment. Details are not described herein again.

In this embodiment of the present disclosure, the DDoS blocking device receives DDoS attack alarm data sent by the DDoS detection device, where the DDoS attack alarm data is obtained after the DDoS detection device parses a service flow flowing into the computer room. The DDoS blocking device matches the DDoS attack alarm data with a DDoS blocking rule, obtains a blocking policy for a service flow corresponding to the DDoS attack alarm data, and blocks the service flow corresponding to the DDoS attack alarm data based on the blocking policy, so that the timeliness and flexibility during defense of a DDoS attack may be improved, thereby improving the robustness of a cloud platform.

Figure 4:
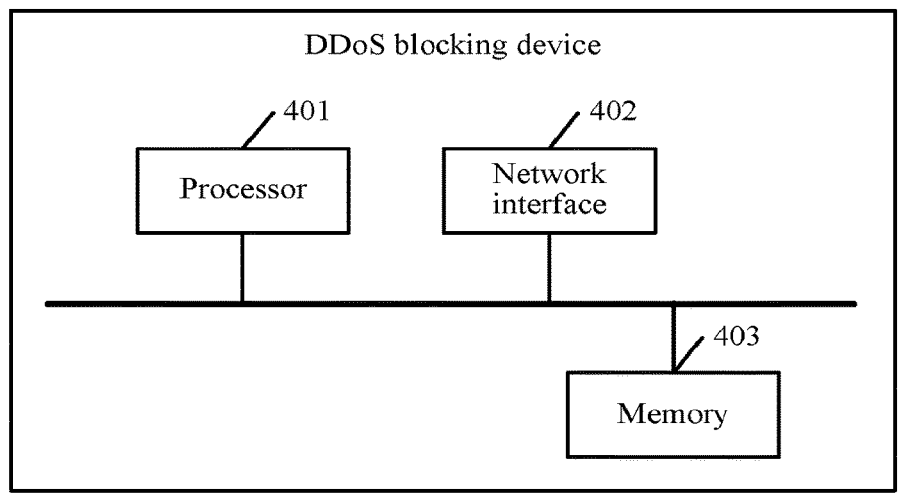
FIG. 4 is a schematic structural diagram of another DDoS blocking device according to an embodiment of the present disclosure.

Referring to FIG. 4, FIG. 4 is a schematic structural diagram of another DDoS blocking device according to an embodiment of the present disclosure. The DDoS blocking device described in this embodiment includes a processor 401, a network interface 402, and a memory 403. The processor 401, the network interface 402, and the memory 403 may be connected by using a bus or in another manner. In this embodiment of the present disclosure, for example, the connection is implemented by using the bus.

The processor 401 (or referred to as a central processing unit (CPU)) is a computing core and a control core of the DDoS blocking device. Optionally, the network interface 402 may include a standard wired interface, a wireless interface (for example, a Wi-Fi or mobile communications interface), and is controlled by the processor 401 to receive/transmit data. The memory 403 is a memory device of the DDoS blocking device, and is configured to store a program and data. It may be understood that the memory 403 herein may be a high speed RAM memory, or may be a non-volatile memory, for example, a magnetic disk storage; optionally, or may be a storage apparatus located far away from the processor 401. The memory 403 provides storage space. The storage space stores an operating system of the DDoS blocking device and executable program code, including but not limited to: a Windows system (an operating system), a Linux (an operating system) system, and so on. This is not limited in the present disclosure.

In this embodiment of the present disclosure, the processor 401 performs the following operations by running the executable program code in the memory 403:

The network interface 402 is configured to receive DDoS attack alarm data sent by a DDoS detection device, where the DDoS attack alarm data is obtained after the DDoS detection device parses a service flow flowing into a computer room.

The processor 401 is configured to: match the DDoS attack alarm data with a DDoS blocking rule, and obtain a blocking policy for a service flow corresponding to the DDoS attack alarm data.

The processor 401 is further configured to block the service flow corresponding to the DDoS attack alarm data based on the blocking policy.

In some feasible implementation manners, the processor 401 is specifically configured to:

determine a customer type corresponding to a destination IP of the DDoS attack alarm data, and obtain a blocking threshold corresponding to the customer type;

compare a service flow of the destination IP with the blocking threshold and a security threshold of the computer room; and if the service flow of the destination IP is greater than or equal to the blocking threshold and is less than the security threshold, determine that the blocking policy for the service flow corresponding to the DDoS attack alarm data is to notify the computer room to block the service flow of the destination IP.

In some feasible implementations, the processor 401 is further configured to: if the service flow of the destination IP is greater than or equal to the security threshold, determine that the blocking policy for the service flow corresponding to the DDoS attack alarm data is that an aligned operator blocks the service flow of the destination IP.

In some feasible implementation manners, the processor 401 is specifically configured to:

for a target operator's outlet of the computer room, obtain a plurality of destination IPs corresponding to DDoS attack alarm data having a same alarm time, where the target operator's outlet is any one of operator's outlets included in the computer room;

compare service flows of the plurality of destination IPs with a blocking threshold corresponding to the target operator's outlet;

if a sum of the service flows of the plurality of destination IPs is greater than or equal to the blocking threshold, determine, based on customer types and values of the service flows that respectively correspond to the plurality of destination IPs, a to-be-blocked destination IP in the plurality of destination IPs; and determining that the blocking policy for the service flow corresponding to the DDoS attack alarm data is that an aligned operator blocks the service flow of the to-be-blocked destination IP.

In some embodiments, the processor 401, the network interface 402, and the memory 403 that are described in this embodiment of the present disclosure may perform the implementation described in the DDoS attack defense method provided in the embodiments of the present disclosure, or may perform the implementation described in the DDoS blocking device provided in the embodiments of the present disclosure. Details are not described herein again.

In this embodiment of the present disclosure, the DDoS blocking device receives DDoS attack alarm data sent by the DDoS detection device, where the DDoS attack alarm data is obtained after the DDoS detection device parses a service flow flowing into the computer room. The DDoS blocking device matches the DDoS attack alarm data with a DDoS blocking rule, obtains a blocking policy for a service flow corresponding to the DDoS attack alarm data, and blocks the service flow corresponding to the DDoS attack alarm data based on the blocking policy, so that the timeliness and flexibility during defense of a DDoS attack may be improved, thereby improving the robustness of a cloud platform.

Figure 5:
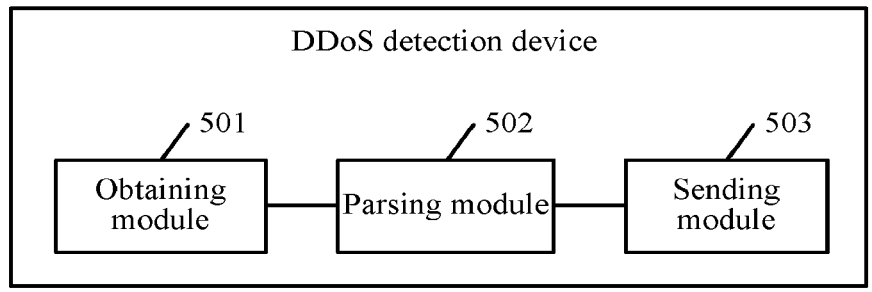
FIG. 5 is a schematic structural diagram of a DDoS detection device according to an embodiment of the present disclosure.

Referring to FIG. 5, FIG. 5 is a schematic structural diagram of a DDoS detection device according to an embodiment of the present disclosure. The DDoS detection device described in this embodiment includes:

an obtaining module 501, configured to obtain a service flow flowing into a computer room;

a parsing module 502, configured to parse the service flow to obtain DDoS attack alarm data; and a sending module 503, configured to send the DDoS attack alarm data to a DDoS blocking device, so that the DDoS blocking device determines, based on a DDoS blocking rule, a blocking policy for a service flow corresponding to the DDoS attack alarm data, and blocks the service flow corresponding to the DDoS attack alarm data based on the blocking policy.

In some feasible implementation manners, the parsing module 502 is specifically configured to:

parse a packet of the service flow according to a specification of a network protocol stack, to generate the DDoS attack alarm data.

It may be understood that functions of various functional modules and units of the DDoS detection device in this embodiment may be specifically implemented according to the method in the foregoing method embodiment, and for a specific implementation process thereof, refer to the related descriptions in the foregoing method embodiment. Details are not described herein again.

In this embodiment of the present disclosure, the DDoS detection device parses a service flow flowing into the computer room to obtain DDoS attack alarm data and sends the DDoS attack alarm data to the DDoS blocking device. The DDoS blocking device determines, based on a DDoS blocking rule, a blocking policy for a service flow corresponding to the DDoS attack alarm data, and blocks the service flow corresponding to the DDoS attack alarm data based on the blocking policy, so that the timeliness and flexibility during defense of a DDoS attack may be improved, thereby improving the robustness of a cloud platform.

Figure 6:
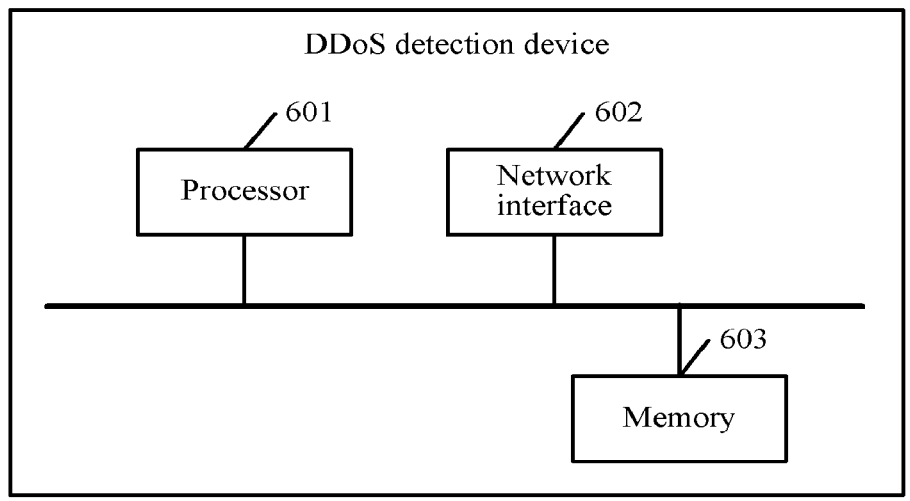
FIG. 6 is a schematic structural diagram of another DDoS detection device according to an embodiment of the present disclosure.

Referring to FIG. 6, FIG. 6 is a schematic structural diagram of another DDoS detection device according to an embodiment of the present disclosure. The DDoS detection device described in this embodiment includes a processor 601, a network interface 602, and a memory 603. The processor 601, the network interface 602, and the memory 603 may be connected by using a bus or in another manner. In this embodiment of the present disclosure, for example, the connection is implemented by using the bus.

The processor 601 (or referred to as a central processing unit (CPU)) is a computing core and a control core of the DDoS detection device. Optionally, the network interface 602 may include a standard wired interface, a wireless interface (for example, a Wi-Fi or mobile communications interface), and is controlled by the processor 601 to receive/transmit data. The memory 603 is a memory device of the DDoS detection device, and is configured to store a program and data. It may be understood that the memory 603 herein may be a high speed RAM memory, or may be a non-volatile memory, for example, a magnetic disk storage; optionally, or may be a storage apparatus located far away from the processor 601. The memory 603 provides storage space. The storage space stores an operating system of the DDoS detection device and executable program code, including but not limited to: a Windows system (an operating system), a Linux (an operating system) system, and so on. This is not limited in the present disclosure.

In this embodiment of the present disclosure, the processor 601 performs the following operations by running the executable program code in the memory 603:

The network interface 602 is configured to obtain a service flow flowing into a computer room.

The processor 601 is configured to parse the service flow to obtain DDoS attack alarm data.

The network interface 602 is further configured to send the DDoS attack alarm data to a DDoS blocking device, so that the DDoS blocking device determines, based on a DDoS blocking rule, a blocking policy for a service flow corresponding to the DDoS attack alarm data, and blocks the service flow corresponding to the DDoS attack alarm data based on the blocking policy.

In some feasible implementation manners, the processor 601 is specifically configured to:

parse a packet of the service flow according to a specification of a network protocol stack, to generate the DDoS attack alarm data.

In some embodiments, the processor 601, the network interface 602, and the memory 603 that are described in this embodiment of the present disclosure may perform the implementation described in the DDoS attack defense method provided in the embodiments of the present disclosure, or may perform the implementation described in the DDoS detection device provided in the embodiments of the present disclosure. Details are not described herein again.

In this embodiment of the present disclosure, the DDoS detection device parses a service flow flowing into the computer room to obtain DDoS attack alarm data and sends the DDoS attack alarm data to the DDoS blocking device. The DDoS blocking device determines, based on a DDoS blocking rule, a blocking policy for a service flow corresponding to the DDoS attack alarm data, and blocks the service flow corresponding to the DDoS attack alarm data based on the blocking policy, so that the timeliness and flexibility during defense of a DDoS attack may be improved, thereby improving the robustness of a cloud platform.

Figure 7:
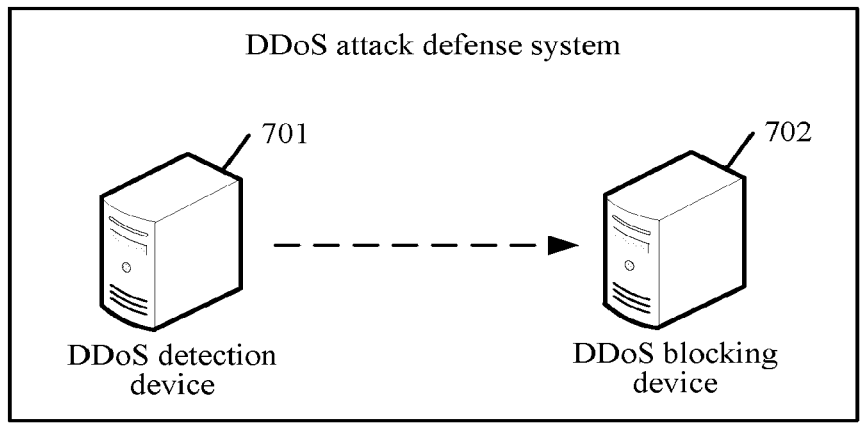
FIG. 7 is a schematic structural diagram of a DDoS attack defense system according to an embodiment of the present disclosure.

Referring to FIG. 7, FIG. 7 is a schematic structural diagram of a DDoS attack defense system according to an embodiment of the present disclosure. The DDoS attack defense system described in this embodiment includes a DDoS detection device 701 and a DDoS blocking device 702.

The DDoS detection device 701 is configured to obtain a service flow flowing into a computer room.

The DDoS detection device 701 is further configured to parse the service flow to obtain DDoS attack alarm data.

The DDoS detection device 701 is further configured to send the DDoS attack alarm data to the DDoS blocking device 702.

The DDoS blocking device 702 is configured to receive the DDoS attack alarm data.

The DDoS blocking device 702 is further configured to: match the DDoS attack alarm data with a DDoS blocking rule, and obtain a blocking policy for a service flow corresponding to the DDoS attack alarm data.

The DDoS blocking device 702 is further configured to block the service flow corresponding to the DDoS attack alarm data based on the blocking policy.

It may be understood that functions of the DDoS detection device 701 and the DDoS blocking device 702 in this embodiment may be specifically implemented according to the method in the foregoing method embodiment, and for a specific implementation process thereof, refer to the related descriptions in the foregoing method embodiment. Details are not described herein again.

In this embodiment of the present disclosure, the DDoS detection device parses a service flow flowing into the computer room to obtain DDoS attack alarm data and sends the DDoS attack alarm data to the DDoS blocking device. The DDoS blocking device matches the DDoS attack alarm data with a DDoS blocking rule, obtains a blocking policy for a service flow corresponding to the DDoS attack alarm data, and blocks the service flow corresponding to the DDoS attack alarm data based on the blocking policy, so that the timeliness and flexibility during defense of a DDoS attack may be improved, thereby improving the robustness of a cloud platform.

A computer storage medium in an embodiment of the present disclosure may be a memory including a computer program. The computer program may be executed by a processor of a data processing apparatus, to perform the steps of the method in the foregoing embodiments. The computer storage medium may be a memory, such as an FRAM, a ROM, a PROM, an EPROM, an EEPROM, a flash memory, a magnetic surface memory, a compact disc, or a CD-ROM; or may be any device including any one of the memories or any combination, such as a mobile phone, a computer, a tablet computer, or a personal digital assistant.

The computer readable storage medium (computer storage medium) stores a computer program. When the computer program is executed by a processor, the following steps of a DDoS attack defense method are performed.

In an embodiment, the computer program is located on a DDoS blocking device side, and the following operations are performed when the computer program is executed by the processor:

receiving, by a DDoS blocking device, DDoS attack alarm data sent by a DDoS detection device, the DDoS attack alarm data being obtained after the DDoS detection device parses a service flow flowing into a computer room;

matching, by the DDoS blocking device, the DDoS attack alarm data with a DDoS blocking rule, and obtaining a blocking policy for a service flow corresponding to the DDoS attack alarm data; and blocking, by the DDoS blocking device, the service flow corresponding to the DDoS attack alarm data based on the blocking policy.

In an embodiment, the computer program is located on the DDoS blocking device side, and the following operations are further performed when the computer program is executed by the processor:

determining, by the DDoS blocking device, a customer type corresponding to a destination IP of the DDoS attack alarm data, and obtaining a blocking threshold corresponding to the customer type;

comparing, by the DDoS blocking device, a service flow of the destination IP with the blocking threshold and a security threshold of the computer room; and determining, by the DDoS blocking device if the service flow of the destination IP is greater than or equal to the blocking threshold and is less than the security threshold, that the blocking policy for the service flow corresponding to the DDoS attack alarm data is to notify the computer room to block the service flow of the destination IP.

In an embodiment, the computer program is located on the DDoS blocking device side, and the following operations are further performed when the computer program is executed by the processor:

determining, by the DDoS blocking device if the service flow of the destination IP is greater than or equal to the security threshold, that the blocking policy for the service flow corresponding to the DDoS attack alarm data is that an aligned operator blocks the service flow of the destination IP.

In an embodiment, the computer program is located on the DDoS blocking device side, and the following operations are further performed when the computer program is executed by the processor:

obtaining, by the DDoS blocking device for a target operator's outlet of the computer room, a plurality of destination IPs corresponding to DDoS attack alarm data having a same alarm time, and comparing service flows of the plurality of destination IPs with a blocking threshold corresponding to the target operator's outlet, where the target operator's outlet is any one of operator's outlets included in the computer room;

determining, by the DDoS blocking device based on customer types and values of the service flows that respectively correspond to the plurality of destination IPs, a to-be-blocked destination IP in the plurality of destination IPs if a sum of the service flows of the plurality of destination IPs is greater than or equal to the blocking threshold; and determining, by the DDoS blocking device, that the blocking policy for the service flow corresponding to the DDoS attack alarm data is that an aligned operator blocks the service flow of the to-be-blocked destination IP.

In an embodiment, the computer program is located on a DDoS detection device side, and the following operations are performed when the computer program is executed by the processor:

obtaining, by a DDoS detection device, a service flow flowing into a computer room;

parsing, by the DDoS detection device, the service flow to obtain DDoS attack alarm data; and sending, by the DDoS detection device, the DDoS attack alarm data to a DDoS blocking device, so that the DDoS blocking device determines, based on a DDoS blocking rule, a blocking policy for a service flow corresponding to the DDoS attack alarm data, and blocks the service flow corresponding to the DDoS attack alarm data based on the blocking policy.

In an embodiment, the computer program is located on the DDoS detection device side, and the following operations are further performed when the computer program is executed by the processor:

parsing, by the DDoS detection device, a packet of the service flow according to a specification of a network protocol stack, to generate the DDoS attack alarm data.

A person of ordinary skill in the art may understand that all or some of the processes of the methods in the embodiments may be implemented by a computer program instructing relevant hardware. The program may be stored in a computer-readable storage medium. When the program runs, the processes of the methods in the embodiments are performed. The storage medium may be: a magnetic disk, an optical disc, a read-only memory (ROM), a random access memory (RAM), or the like.

What is disclosed above is merely exemplary embodiments of the present disclosure, and certainly is not intended to limit the protection scope of the present disclosure. A person of ordinary skill in the art may understand that all or some of processes that implement the foregoing embodiments and equivalent modifications made in accordance with the claims of the present disclosure shall fall within the scope of the present disclosure.

In embodiments of the present disclosure, a DDoS blocking device receives DDoS attack alarm data sent by a DDoS detection device, where the DDoS attack alarm data is obtained after the DDoS detection device parses a service flow flowing into a computer room. The DDoS blocking device matches the DDoS attack alarm data with a DDoS blocking rule, obtains a blocking policy for a service flow corresponding to the DDoS attack alarm data, and blocks the service flow corresponding to the DDoS attack alarm data based on the blocking policy, so that the timeliness and flexibility during defense of a DDoS attack may be improved.

It is noted that the various modules, submodules, units, subunits, and components in the present disclosure can be implemented using any suitable technology. For example, a module or a unit can be implemented using processing circuitry. In an example, a module or a unit can be implemented using integrated circuit (IC). In another example, a module or a unit can be implemented as a processor executing software instructions. In another example, interface circuitry is used to implement receiving unit (or module) and/or sending unit (or module).

What is claimed is:

1. A method for defending against a distributed denial of service attack, the method comprising:

receiving, by a blocking device, packets that enter a service network providing services to servers that are receiving the services from the service network;

parsing the packets to identify attacking packets and generating alarm data based on the attacking packets;

determining, by the blocking device, a blocking policy for blocking the attacking packets based on the alarm data and blocking rules; and initiating, by the blocking device, a blocking action to block the attacking packets based on the blocking policy, wherein the blocking rules are used to determine whether the servers are attacked based on types of clients of an internet service provider, which is defined by at least one of payment method by the clients, bandwidth purchased by the clients, and quantity of users of the clients, and the blocking rules are customized according to a request of one of the clients of the internet service provider, the one of the clients being at least one of a border gateway protocol high-defense client or a client with a priority higher than priorities of other clients.

2. The method of claim 1, wherein the packets that enter the service network are mirrored by an optical splitter from the internet service provider in real time.

3. The method of claim 1, wherein the packets to identify the attacking packets are parsed according to a specification of a network protocol stack of the service network.

4. The method of claim 3, wherein the alarm data contains at least one of:

an attack time;

an attack type;

a destination internet protocol;

an attack position;

a value corresponding to the packets;

a transmission control protocol of the network protocol stack; or a user datagram protocol of the network protocol stack.

5. The method of claim 1, wherein the determining the blocking policy for blocking the attacking packets comprises:

determining a type of a client of the internet service provider according to a destination internet protocol of the alarm data;

obtaining a blocking threshold corresponding to the determined type of the client;

comparing packets of the destination internet protocol of the alarm data with the obtained blocking threshold and a security threshold corresponding to the servers;

sending a first notification of the blocking action to the servers when the packets of the destination internet protocol of the alarm data are greater than or equal to the obtained blocking threshold and are smaller than the security threshold corresponding to the servers; and sending a second notification of the blocking action to the internet service provider when the packets of the destination internet protocol of the alai data are greater than or equal to the security threshold corresponding to the servers.

6. The method of claim 5, wherein the initiating the blocking action to block the attacking packets based on the blocking policy comprises one of:

causing an ingress router or a core switch of the servers to discard the packets of the destination internet protocol of the alarm data; or causing a blocking interface of the internet service provider to discard the packets of the destination internet protocol before the packets reach the servers.

7. The method of claim 1, wherein the determining the blocking policy for blocking the attacking packets comprises:
obtaining a plurality of destination internet protocols of the alarm data having a same alarm time;
comparing a sum of the packets of the plurality of destination internet protocols of the alarm data with a security threshold corresponding to the servers;
determining the destination internet protocols that are to be blocked through the blocking action based on the types of clients of the internet service provider and the packets corresponding to the plurality of destination internet protocols of the alarm data when the sum of the packets of the plurality of destination internet protocols of the alarm data is greater than or equal to the security threshold corresponding to the servers; and
sending a notification of the blocking action to the internet service provider.

8. The method of claim 7, wherein the initiating the blocking action to block the attacking packets based on the blocking policy comprises:
causing a blocking interface of the internet service provider to discard the packets of the determined destination internet protocol before the packets reach the servers.

9. The method of claim 1, further comprising:
sending a result of the blocking action to a client of the internet service provider so that the client adjusts an internet service that is affected by the attacking packets in real time or selects an alternative internet service,
wherein the result of the blocking action contains at least one of a blocking time, a service type of the attacking packets, or a value corresponding to the packets.

10. A blocking device for defending against a distributed denial of service attack, the blocking device comprising:
processing circuitry configured to:
receive packets that enter a service network that provides services to servers that receive the services from the service network;
parse the packets to identify attacking packets and generate alarm data based on the attacking packets;
determine a blocking policy for blocking the attacking packets based on the alarm data and blocking rules; and
initiate a blocking action to block the attacking packets based on the blocking policy,
wherein the blocking rules are used to determine whether the servers are attacked based on types of clients of an internet service provider, which is defined by at least one of payment method by the clients, bandwidth purchased by the clients, and quantity of users of the clients, and the blocking rules are customized according to a request of one of the clients of the internet service provider, the one of the clients being at least one of a border gateway protocol high-defense client or a client with a priority higher than priorities of other clients.

11. The blocking device of claim 10, wherein the packets that enter the service network are mirrored by an optical splitter from the internet service provider in real time, and the packets to identify the attacking packets are parsed according to a specification of a network protocol stack of the service network.

12. The blocking device of claim 11, wherein the alarm data contains at least one of:

an attack time;
an attack type;
a destination internet protocol;
an attack position;
a value corresponding to the packets;
a transmission control protocol of the network protocol stack; or
a user datagram protocol of the network protocol stack.

13. The blocking device of claim 10, wherein the determining the blocking policy for blocking the attacking packets comprises:
determining a type of a client of the internet service provider according to a destination internet protocol of the alarm data;
obtaining a blocking threshold corresponding to the determined type of the client;
comparing packets of the destination internet protocol of the alarm data with the obtained blocking threshold and a security threshold corresponding to the servers;
sending a first notification of the blocking action to the servers when the packets of the destination internet protocol of the alarm data are greater than or equal to the obtained blocking threshold and are smaller than the security threshold corresponding to the servers; and
sending a notification of the blocking action to the internet service provider when the packets of the destination internet protocol of the alarm data are greater than or equal to the security threshold corresponding to the servers.

14. The blocking device of claim 13, wherein the initiating the blocking action to block the attacking packets based on the blocking policy comprises one of:
causing an ingress router or a core switch of the servers to discard the packets of the destination internet protocol of the alarm data; or
causing a blocking interface of the internet service provider to discard the packets of the destination internet protocol before the packets reach the servers.

15. The blocking device of claim 10, wherein the determining the blocking policy for blocking the attacking packets comprises:
obtaining a plurality of destination internet protocols of the alarm data having a same alarm time;
comparing a sum of packets of the plurality of destination internet protocols of the alarm data with a security threshold corresponding to the servers;
determining destination internet protocols that are to be blocked through the blocking action based on the types of clients of the internet service provider and packets corresponding to the plurality of destination internet protocols of the alarm data when the sum of the packets of the plurality of destination internet protocols of the alarm data is greater than or equal to the security threshold corresponding to the servers; and
sending a notification of the blocking action to the internet service provider.

16. The blocking device of claim 15, wherein the initiating the blocking action to block the attacking packets based on the blocking policy comprises:
causing a blocking interface of the internet service provider to discard packets of the determined destination internet protocol before the packets reach the servers.

17. The blocking device of claim 10, wherein the processing circuitry is further configured to:
send a result of the blocking action to a client of the internet service provider so that the client adjusts an internet service that is affected by the attacking packets in real time or selects an alternative internet service, wherein the result of the blocking action contains at least one of a blocking time, a service type of the attacking packets, or a value corresponding to the packets.

18. A non-transitory computer-readable storage medium storing instructions which when executed by at least one processor cause the at least one processor to perform:

receiving packets that enter a service network providing services to servers that are receiving the services from the service network;

parsing the packets to identify attacking packets and generating alarm data based on the attacking packets;

determining a blocking policy for blocking the attacking packets based on the alarm data and blocking rules; and initiating a blocking action to block the attacking packets based on the blocking policy, wherein the blocking rules are used to determine whether the servers are attacked based on types of clients of an internet service provider, which is defined by at least one of payment method by the clients, bandwidth purchased by the clients, and quantity of users of the clients, and the blocking rules are customized according to a request of one of the clients of the internet service provider, the one of the clients being at least one of a border gateway protocol high-defense client or a client with a priority higher than priorities of other clients.

* * * * *